United States Patent [19]

Kondo

[11] Patent Number: 5,423,494
[45] Date of Patent: Jun. 13, 1995

[54] PET ROPE WINDER

[75] Inventor: Takanori Kondo, Urawa, Japan

[73] Assignee: Daido Tokushuko Kabushiki Kaisha, Nagoya, Japan

[21] Appl. No.: 189,263

[22] Filed: Jan. 28, 1994

Related U.S. Application Data

[63] Continuation-in-part of Ser. No. 996,240, Dec. 23, 1992, abandoned.

[30] Foreign Application Priority Data

Oct. 1, 1992 [JP] Japan ............... 4-000532 U

[51] Int. Cl.6 .................. B65H 75/48; A01K 27/00
[52] U.S. Cl. .................... 242/381.5; 242/381.6
[58] Field of Search ............ 242/99, 100.1, 107, 242/107.3, 107.4 R, 381.5, 381.6; 119/106, 109

[56] References Cited

U.S. PATENT DOCUMENTS

| | | | |
|---|---|---|---|
| 2,222,409 | 11/1940 | Gottlieb | 242/107.3 |
| 2,250,171 | 7/1941 | Wilkins | 242/107.3 |
| 2,314,504 | 3/1943 | Lifchultz | 242/107.4 R |
| 2,776,644 | 1/1957 | Fontaine | 242/99 |
| 2,799,245 | 7/1957 | Ruggiero et al. | 119/106 |
| 2,833,250 | 5/1958 | Beebe | 119/109 |
| 2,889,807 | 6/1959 | Beebe | 119/109 |
| 2,919,676 | 1/1960 | Schneider | 119/106 |
| 3,198,175 | 8/1965 | Dean | 242/99 |
| 3,233,591 | 2/1966 | Rogers et al. | 119/109 |
| 3,250,253 | 5/1966 | Galin | 119/109 |
| 3,315,642 | 4/1967 | Rogers et al. | 119/109 |
| 3,318,288 | 5/1967 | Müllritter | 119/109 |
| 3,339,030 | 8/1967 | Nilsson | 242/107.3 |
| 3,477,410 | 11/1969 | Lettieri | 119/109 |
| 3,693,596 | 9/1972 | Croce et al. | 242/107.4 R X |
| 3,889,897 | 6/1975 | Van Zelderen | 242/107.3 |
| 3,937,418 | 2/1976 | Critelli | 119/109 X |
| 4,018,189 | 4/1977 | Umphries et al. | 119/109 |
| 4,197,817 | 4/1980 | Crutchfield | 119/109 |
| 4,328,766 | 5/1982 | Deibert | 119/109 |
| 4,328,767 | 5/1982 | Peterson | 119/109 |
| 4,485,278 | 11/1984 | Schaller et al. | 242/107.3 X |
| 4,500,048 | 2/1985 | Schaller | 242/107.3 |
| 4,501,230 | 2/1985 | Talo | 119/109 |
| 4,887,551 | 12/1989 | Musetti | 119/109 |
| 4,907,756 | 3/1990 | Bourrat | 242/107.3 |

FOREIGN PATENT DOCUMENTS

| | | | |
|---|---|---|---|
| 0464725 | 1/1992 | European Pat. Off. | 119/109 |
| 2251259 | 6/1975 | France | 119/109 |
| 2818222 | 5/1979 | Germany | 119/109 |
| 3040281 | 7/1982 | Germany | 119/106 |
| 2-8157 | 1/1990 | Japan | 242/107.3 |
| 8201744 | 11/1982 | Netherlands | 119/109 |
| 1559082 | 1/1980 | United Kingdom | 119/109 |

Primary Examiner—Daniel P. Stodola
Assistant Examiner—John P. Darling
Attorney, Agent, or Firm—Fulbright & Jaworski

[57] ABSTRACT

A spring loaded rope winder having a centrifugal brake mechanism incorporated in the reel of the rope winder with the effect of slowing the winding-up of rope onto the reel.

5 Claims, 5 Drawing Sheets

PET ROPE WINDER

This is a continuation-in-part of application Ser. No. 07/996,240 filed on Dec. 23, 1992, now abandoned.

FIELD OF THE INVENTION

This invention relates to a pet rope winder which automatically winds up a rope to be connected to, for instance, a dog collar.

BACKGROUND OF THE INVENTION AND RELATED ART STATEMENT

In this type of device based on the prior art, a reel is rotatably mounted in a case and is energized in one direction by a spring, a rope is wound around this reel in the direction contrary to that in which the reel is energized, and a locking mechanism which stops the rope once wound around the reel and then dispenses it by a specified length at the specified position.

In the prior art devices as described above, however, if the rope is wound in too fast after locking is released, a metal fitting at an edge of the rope jumps, which may give an unexpected injury to the user. Thus the spring to energize the reel is made thinner and longer to make the reel's energizing force weaker (to a low torque) for damping the reel's speed to wind up the rope. In such a case, however, the winder does not work smoothly.

Several braking devices in the prior art have been directed toward the problem of rewinding the reel at safe speed without sacrificing recoil spring strength. For example, U.S. Pat. No. 4,500,048 to Schaller et al. discloses a one-piece bending centrifugal weight that is bent outwardly against a braking surface by rotation of a wheel inside the reel. That device has the disadvantage of being inherently complex and having substantial weight, distal to the point of rotation, not directly involved in the braking of the reel. Further, much of the centrifugal force of the brake is stored in the bending member of the brake, thereby damping the braking effect.

U.S. Pat. No. 4,907,756 to Bourrat is similar to Schaller. Though having two opposing weights as part of a centrifugal braking mechanism, those weights are contained immovably within a cradle pair, rendering in effect a bending centrifugal weight as disclosed by Schaller. Like the braking mechanism of Schaller, the braking mechanism of Bourrat has substantial weight not directly involved in the braking of the reel and inefficiently dampens, through the bending member, the braking mechanism.

OBJECT AND SUMMARY OF THE INVENTION

An object of the present invention is to provide a pet rope winder which can solve the problem as described above, namely a pet rope winder which can lock a rope with a locking mechanism for preventing the rope from being wound up or dispensed and also can completely and smoothly wind up the rope to its end in a low speed and without unnecessary weight.

To achieve the foregoing object, there is provided a pet rope winder having an centrifugal braking mechanism. In the pet rope winder according to the present invention, the reel can be controlled by the sliding centrifugal brake mechanism, so that it is possible to wind up a rope in a low speed. The pet rope winder according to the present invention can smoothly wind up a rope and is very practical.

In one embodiment of the present invention, the centrifugal brake mechanism comprises a pocket section arranged in the reel and a brake piece moveably accommodated in said pocket section facing an inner peripheral wall at a small clearance therefrom. With this feature the centrifugal brake mechanism can easily be assembled and installed in a small space inside the case, and the manufacturing cost is very cheap. In another embodiment of the present invention, the brake piece is made of either resin or rubber. This feature eliminates noises generated by friction between the brake piece and the inner wall of the case when a braking force is loaded to the reel.

In another embodiment of the invention, there is disclosed a pet rope winder comprising a reel having an axis and first and second flanges, said flanges having an outer periphery; at least one of said two flanges having a retaining means for retaining a brake piece; a brake piece unattachedly and movably retained with said retaining means such that said brake piece can move beyond said outer periphery in response to a centrifugal force upon rotation of said reel about said axis; and a casing in which said reel is rotatably mounted, said casing defining a wall along a suitably small clearance of the periphery of said flange defining the said pocket, said wall being substantially parallel to said axis of said reel.

The claimed invention has the advantage of providing a simple, sliding braking mechanism in which virtually the entire weight of the centrifugal mechanism can be employed directly in braking. For example, in particular, the pocket or other means for retaining the brake-piece can be construed of particularly thin or light material, rendering it negligible in weight. Further, the claimed invention has the advantage of not damping with a bending member the centrifugal braking force, thus making it possible to use lighter brake pieces than heretofore disclosed in the prior art.

DETAILED DESCRIPTION

Figure 1:
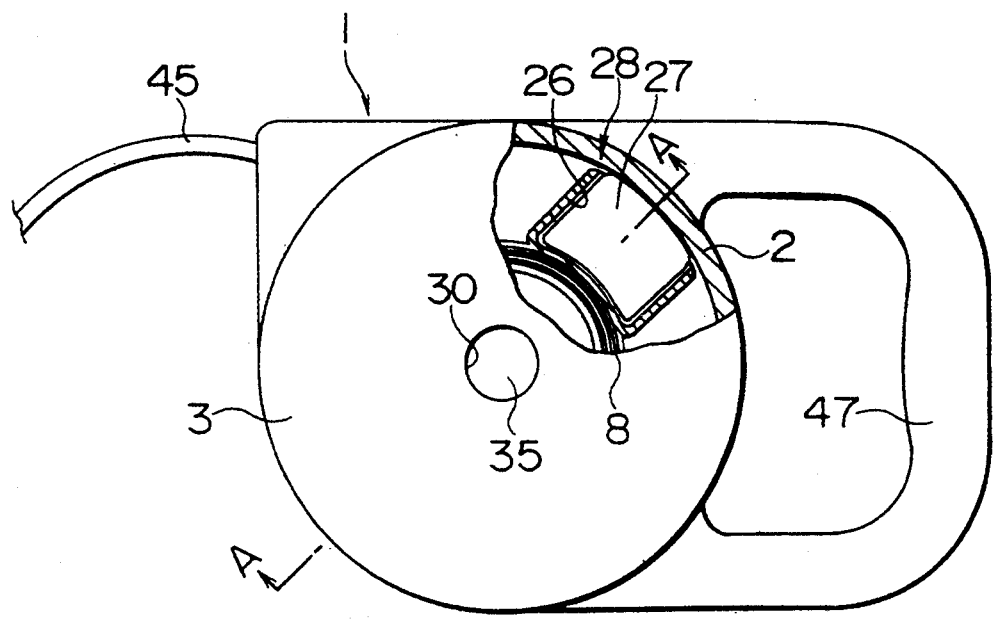
FIG. 1 is a partially broken flat view of a pet rope winder according to the present invention.
Figure 2:
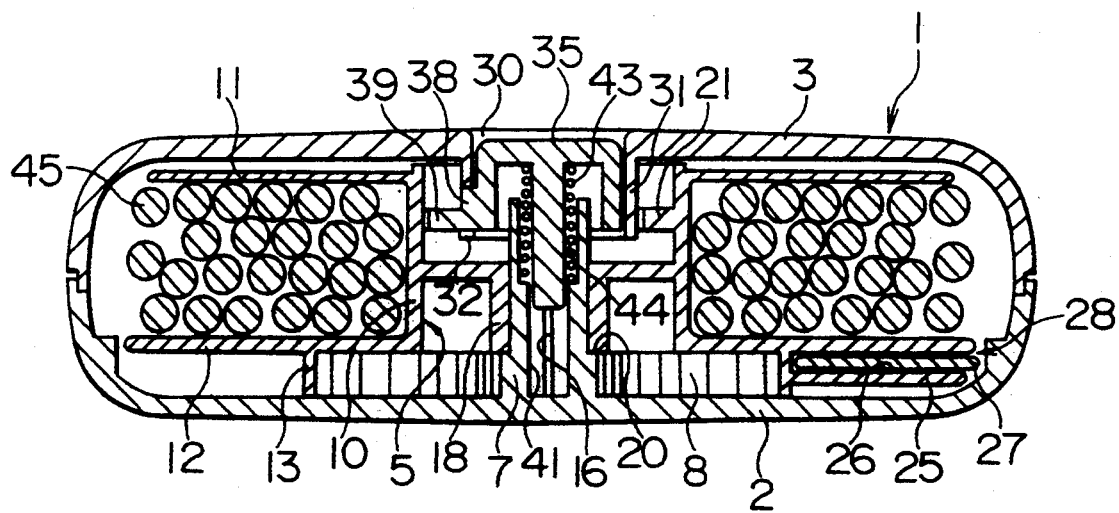
FIG. 2 is a cross section taken along the line A—A in FIG. 1.
Figure 3A:
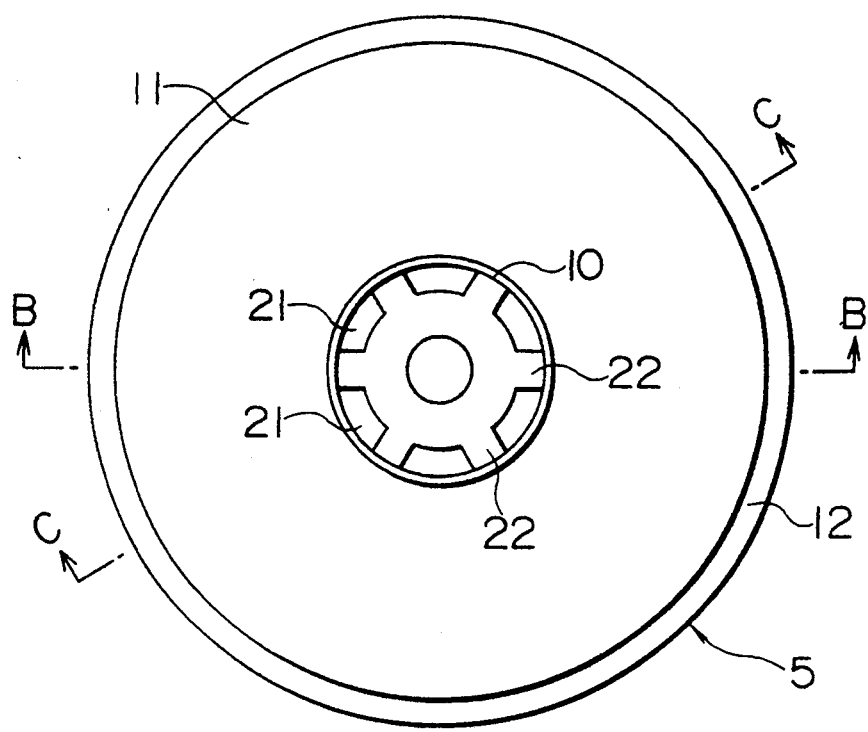
FIG. 3A is a flat view of a reel.
Figure 3B:
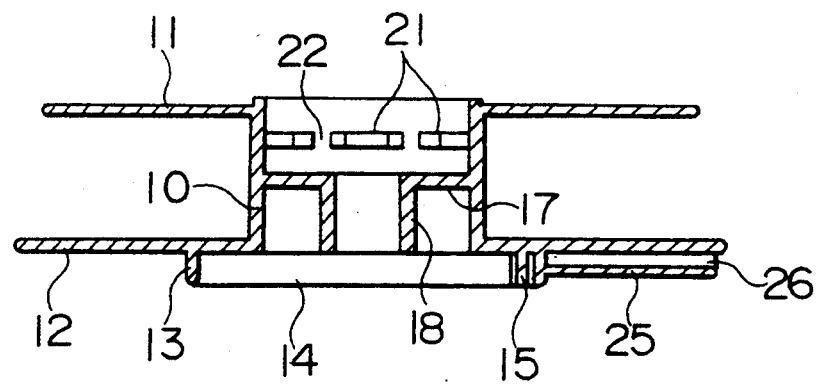
FIG. 3B is a cross section taken along the line B—B in FIG. 3A.
Figure 3C:
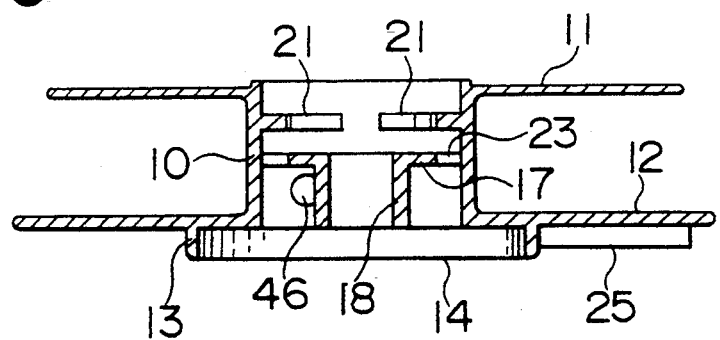
FIG. 3C is a cross section taken along the line C—C in FIG. 3A.
Figure 3D:
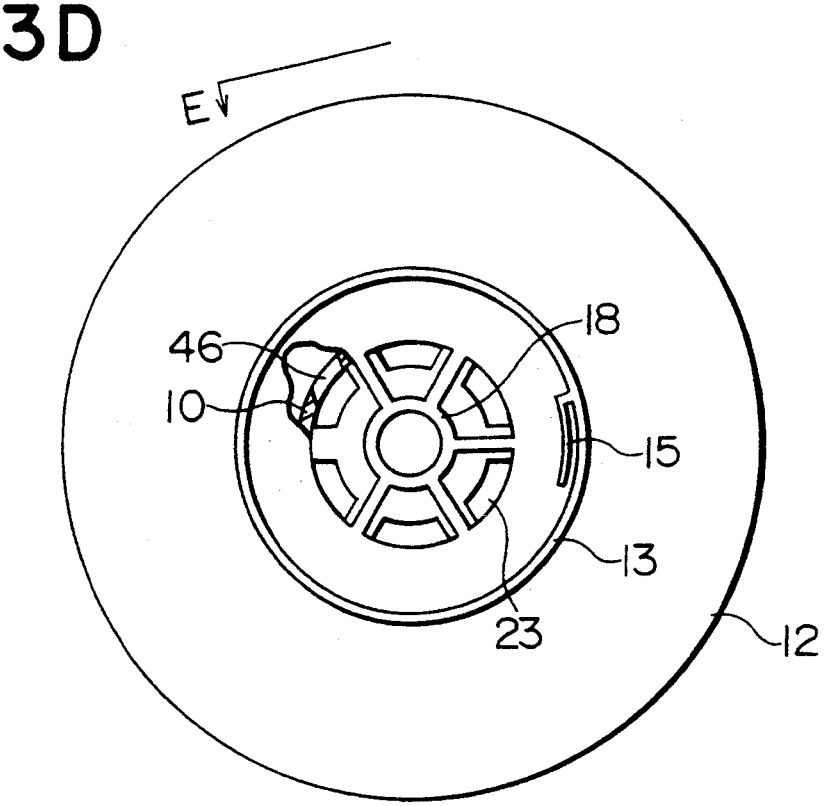
FIG. 3D is a partially broken bottom view of a reel.
Figure 3E:
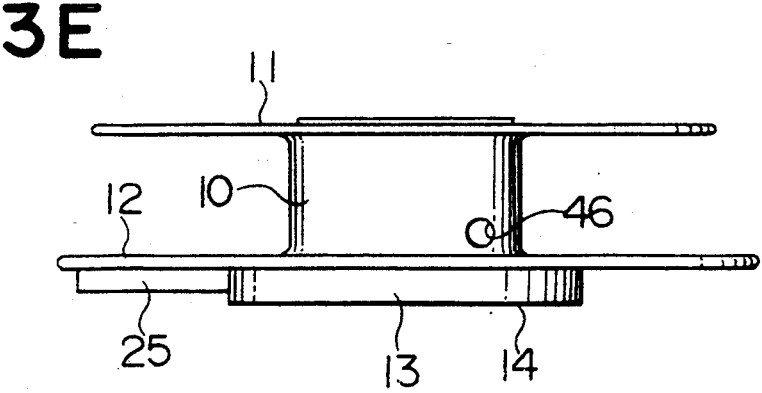
FIG. 3E is a front view of the section shown in FIG. 3D viewed from the direction indicated by arrow mark E.

In FIGS. 1 and 2, the numeral 1 indicates a case which comprises a lower case 2 and an upper case 3. A reel 5 is rotatably installed being supported by a central shaft 7 arranged in the lower case 2 and also being energized by a spring 8 in one direction.

As shown in FIG. 3A to 3E, the reel 5 has a hollow basic body 10 of the reel and a circular flange 11 is provided on an outer periphery of one edge of said basic body. Also, a circular flange 12, which is somewhat larger than the flange 11, is provided on an outer periphery of another edge of said body 10, and this flange 12 and a cylindrical section 13 constitute a supporting frame 14 for the spring 8. The numeral 15 indicates a locking piece provided on the supporting frame 14, and an outer edge of the spring 8 is locked in this locking piece 15, and an inner edge is supported in the supporting frame 14 being locked in a locking groove arranged in the central shaft 7 to energize the reel 5 in one direction.

A circular wall 17 is arranged at almost a central position of the inner face of the basic body 10 of the reel, and on the inner periphery of said circular wall is arranged a hollow supporting cylinder 18 engaged in and supported by the central shaft 7 facing the other edge side of the basic body 10 of the reel. The tip of the supporting cylinder almost coincides with the other edge periphery of the basic body 10 of the reel, and said tip contacts a staged section 20 having a small diameter arranged in the central shaft when the reel 5 is installed. A plurality of (6 pieces in this example) locking protrusions 21 each having the same size are arranged at almost a central position between the circular wall 17 on the inner face of the basic section 10 of the reel and the edge periphery with a groove section 22 at an equal interval between each locking protrusions. The numeral 23 is a throughhole arranged on the circular wall 17.

In the outer periphery side of the flange 12 of the reel 5 is arranged a shrouding wall 25, a pocket section 26 having an opening only in the inner peripheral surface of the case 1 enclosed by said shrouding wall and the flange 12. A brake piece 27 is moveably accommodated in said pocket section at a small clearance with the inner peripheral wall of the case 1, and the pocket section 26 and the brake piece 27 constitute a centrifugal brake mechanism 28 which controls movement of the reel 5. Any material is available so long as the brake piece 27 has a certain weight, but such materials iron plate, polychrolinated vinyl, and rubber are preferable.

Figure 4:
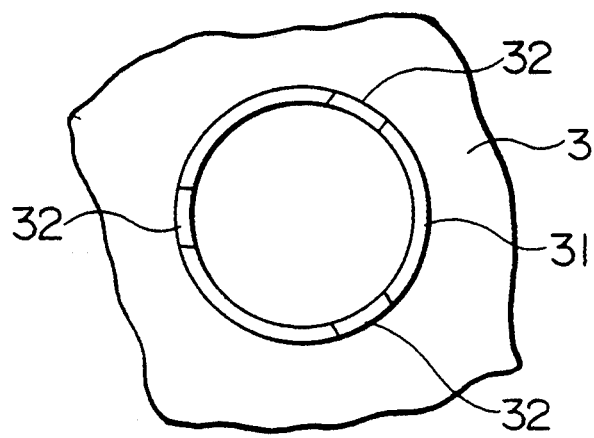
FIG. 4 is a bottom view of a key section of the upper case.

On the other hand, a circular opening 30 is arranged in the side wall of the upper case facing the central shaft of the lower case 2, and a hollow and cylindrical guide cylinder 31 to accommodate a locking member described later is arranged on said opening periphery with the tip protruded up to a position beyond the locking protrusion 21 of the reel 5. A plurality of (3 pieces in this case) locking member positioning holes 32 are arranged at the tip of the guide cylinder 31 at an equal space with the tip opened as shown in FIG.4.

Figure 5A:
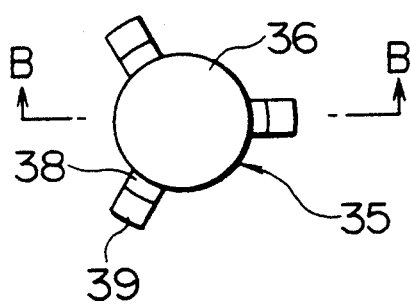
FIG. 5A is a flat view of a locking member.
Figure 5B:
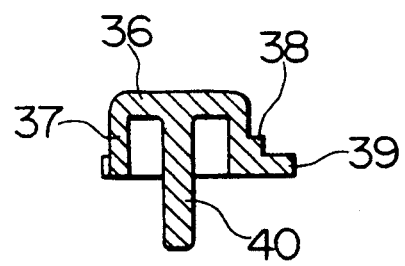
FIG. 5B is a cross section of the portion shown in FIG. 5A taken along the line B—B.
Figure 6A:
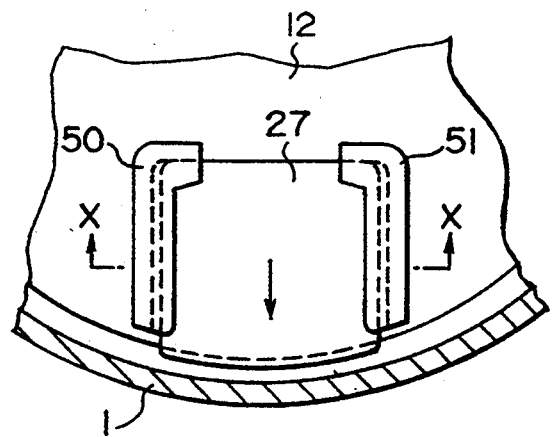
FIG. 6A is a flat view of a first alternative embodiment of a braking mechanism.
Figure 6B:
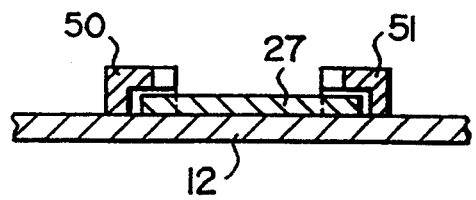
FIG. 6B is a cross-sectional view of the braking mechanism of FIG. 6A along the line X—X.

A locking member 35 is accommodated moveably in the axial direction of the reel 5 inside the guide cylinder 31. As shown in FIGS. 5A and 5B, the same number of positioning protrusions 38 each locked in a positioning hole 32 of the guide cylinder 31 as the number of said holes are arranged on the lower external peripheral surface of the cylinder section 37 having a vertex wall 36, and a locking protrusion 39 engaged in the groove section 22 between locking protrusions 21 of the reel 5 and locked in the locking protrusion 21 in the peripheral direction is arranged. The numeral 40 indicates a guide rod hanging from a central portion of the vertex wall 36 of the cylinder 37, which is moveably engaged in a shaft hole 41 of the central shaft 7. The numeral 43 indicates a spring to energize upward the locking protrusion 39 of the locking member 35 so that said protrusion 38 is engaged in the groove 22 to keep the reel 5 always locked in the locking protrusion 21, and this spring is installed between a receiving groove 44 formed in the lower portion of the shaft hole 41 and the vertex wall 36 of the locking member 35.

The numeral 45 is a pet rope having a specified length, and one edge side thereof is inserted into the case 1 from a rope dispensing port (not shown) arranged in the case 1, and is wound around on the external surface of the basic body 10 of the reel between the two flanges 11 and 12 in the direction contrary to that in which the rope is energized by the spring 8. And, one end of the rope 45 is led into inside of the supporting cylinder 18 from the rope receiving port 46 and is fixed to said supporting cylinder or others with an appropriate means. In FIG. 1, the numeral 47 indicates a handle which a user holds the case with the above described mechanism.

Description is made below for operations of this embodiment. FIG. 2 shows a state where the rope 45 has been wound around the reel 5, namely a state where most of the rope 45 has been accommodated inside the case and is not used. In this state, the locking protrusion 39 of the locking member 35 is engaged in the groove section 22 between the locking protrusions 21 on the reel 5, and is locked in said locking protrusion 21 so that the reel 5 will not turn. As clearly shown in FIG.2, also in this locked state, the locking member does not protrude from the opening 30 to the surface of the upper case 3, so that the locking member will never be pushed in carelessly.

To draw out the rope 45 from inside of the case 1 for use, the locking member 35 is pushed in against a force of a spring 43 by inserting a finger tip or other appropriate tool. With this, the locking protrusion 39 of the locking member 35 moves to the lower part of the groove 22 between the locking protrusions 21 of the reel 5, and locking with the locking protrusion 21 is released, so the rope 45 at around the aforesaid dispensing port is pulled out keeping this unlocked state and the rope 45 wound around the reel 5 is gradually pulled out. And, when pushing the locking member 35 is ceased after the rope has been pulled out by a specified length, the lock member 35 moves upward due to a force by the spring 43, and the locking protrusion 39 is engaged in the groove 22 between the locking protrusions of the reel 6 to be locked in the locking protrusion. The locked state is, thus, restored. For this reason, the rope 45 is not pulled out any more, and the rope pulled out by a specified length can be used in the locked state. Note that, although sometimes the locking protrusion 39 hits the lower surface of the protrusion 21 and is not engaged in the groove 22 smoothly, the rope 45 can easily be engaged in the groove 22 by slightly pulling it and giving a driving force to the reel 5.

To wind up the rope 45 around the reel 5 inside the case 1 after use, locking between the locking protrusion 39 and the locking protrusion 21 is released by pushing in the locking member 35 as described above. With this operation, the reel 5 rotates in the direction to wind up the rope 45 due to a force of the spring 8 and the pulled-out rope is wound around the reel 5. When the reel 5 rotates to wind up the rope, the brake piece 27 accommodated in the pocket section 26 of the reel 5 slide to the outer side due to the centrifugal force, and the tip slidingly contact the inner peripheral surface of the lower case 2. Thus, centrifugal braking force is loaded to the reel 5, and the rope 45 is wound up in a slow speed.

After the rope is wound up, when pushing the lock member 35 is ceased, the locking member 35 is engaged in the groove 22 between the locking protrusions on the reel 5 to be locked with the locking protrusion 21, thus the locking state being realized.

Note that the centrifugal brake mechanism as described above is only one example, and particular designs other than the one described above are also acceptable. Also the above description assumes a device to wind up a rope set to a dog ring, but it is needless to say that this construction can be applied to a device to wind up a rope for other pets.

FIGS. 6A, 6B, FIGS. 7A, 7B, and FIGS. 8A, 8B show different embodiments of the present invention. In the modes for carrying out the present invention shown in FIG. 6A and FIG. 6B, a pair of engaging pieces 50, 51 each having an L-shaped cross section are provided on the outer surface (in the side of spring 8) of the flange 12 opposing the both side edges as well as the rear edge of the brake piece 27, and these engaging pieces 50, 51 are engaged with the both side edges as well as the rear side edge of the brake piece 27 to hold the brake piece 27.

Figure 7A:
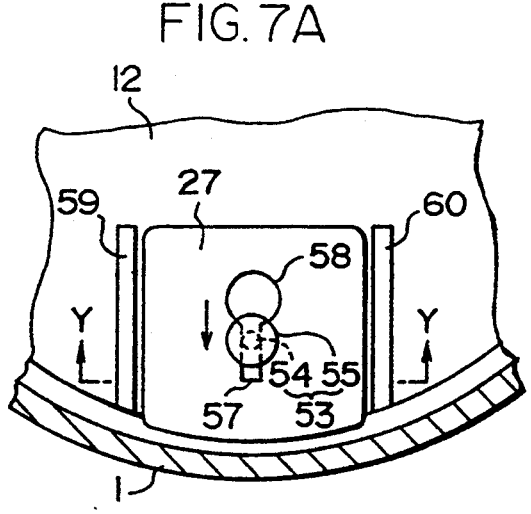
FIG. 7A is a flat view of a second alternative embodiment of a braking mechanism.
Figure 7B:
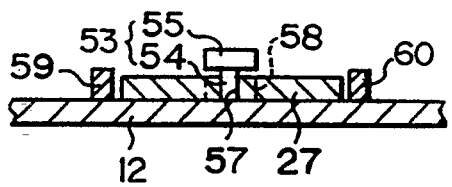
FIG. 7B is a cross-sectional view of the braking mechanism of FIG. 7A along the line Y—Y.

In the modes for carrying out the present invention shown in FIG. 7A and FIG. 7B, a projection for engagement 53 comprises a shaft section 54 longer than a thickness of the brake piece 27 and a head section 55 having a large diameter and provided at the upper edge of said shaft section. The projection 53 is positioned on the external surface of the flange 12 opposing a substantially central section of the brake piece 27. The linear groove for engagement 57 engages the shaft section 54 along the sliding direction of the brake piece 27. The hole 58 has a size large enough for the head section 55 to be engaged therein. The brake piece 27 is held by the projection for engagement 53 which is engaged with the groove for engagement 57 and the head section 55 through hole 58 which are engaged with each other when setting. The reference numerals 59, 60 denote a pair of ribs guiding sliding of the brake piece 27, which are provided on the flanges 12 in the both sides of the brake piece 27.

Figure 8A:
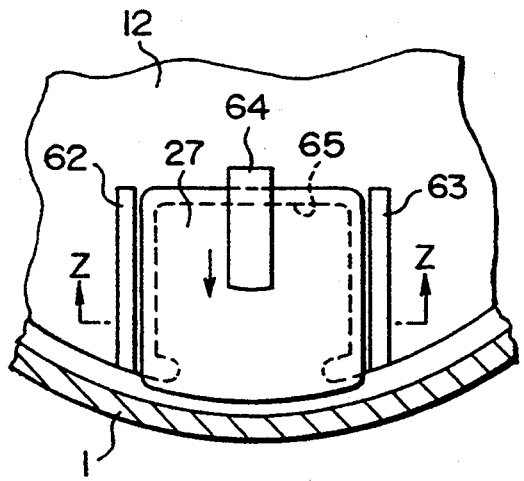
FIG. 8A is a flat view of a third alternative embodiment of a braking mechanism.
Figure 8B:
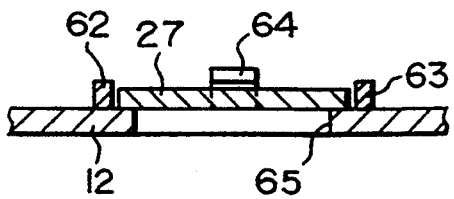
FIG. 8B is a cross-sectional view of the braking mechanism of FIG. 8A along the line Z—Z.

In the mode for carrying out the present invention as shown in FIG. 8A and 8B, the brake piece 27 is held by a pair of ribs 62, 63 similar to the foregoing ribs 59, 60 and an engaging piece 64 having an L-shaped cross section formed in a bending form at the tip of the brake piece 27, positioned on the flange 12 in a distance longer at least than a sliding distance of the brake piece 27 on the rear edge of the brake piece 27 which is positioned between the two ribs 62, 63. The reference numeral 65 is a notch formed with a portion of the both side edges as well as the rear edge of the brake piece 27 left therein, and provides the addition advantage of eliminating unnecessary weight from the flange, thereby reducing the overall weight of the apparatus.

The brake piece 27 supported by the engaging pieces 50, 51; projection for engagement 53; ribs 62, 63; and engaging piece 64 respectively slides outward as indicated by an arrowhead in this figure due to a centrifugal force loaded thereto when a rope is wound up, and the tip slidingly contacts the internal wall of the case 1, and this action is the same as that in the modes for carrying out the invention described above.

Although particular embodiments of the invention has been disclosed in detail for illustrative purposes, it will be recognized that variations or modifications of the disclosed apparatus, including the rearrangement of parts, lie within the scope of the present invention.

What is claimed is:

1. A pet rope winder comprising:

a case;

a reel rotatably accommodated in said case and supported by a shaft provided in said case, said reel comprising a basic body having peripheral edges and first and second flanges provided on said peripheral edges of said basic body, said flanges extending radially from said basic body;

a spring energizing said reel in a rope windup direction;

a brake piece radially and slidingly positioned on an external face of at least one of said first and second flanges of said reel, whereby said brake piece slides outward from said basic body upon application of a centrifugal force effected when a rope is wound up and whereby said brake piece slidingly contacts an internal peripheral wall of said case, said internal peripheral wall being substantially parallel to said shaft of said case; and means for holding said brake piece, said holding means positioned on an external face of said flange and comprising a surrounding wall forming a pocket section having an opening opposite the internal peripheral wall of the case for slidingly accommodating the brake piece.

2. A pet rope winder comprising:

a case;

a reel rotatably accommodated in said case and supported by a shaft provided in said case, said reel comprising a basic body having peripheral edges and first and second flanges provided on said peripheral edges of said basic body, said flanges extending radially from said basic body;

a spring energizing said reel in a rope windup direction;

a brake piece radially and slidingly positioned on an external face of at least one of said first and second flanges of said reel, whereby said brake piece slides outward from said basic body upon application of a centrifugal force effected when a rope is wound up and whereby said brake piece slidingly contacts an inner peripheral wall of said case, said internal peripheral wall being substantially parallel to said shaft of said case; and means for holding said brake piece, said holding means positioned on the external face of the flange and comprising a pair of engaging pieces each having an L-shaped cross section for engaging one of two side edges and a portion of a rear edge of the brake piece to hold the brake piece.

3. A pet rope winder comprising:

a case;

a reel rotatably accommodated in said case and supported by a shaft provided in said case, said reel comprising a basic body having peripheral edges and first and second flanges provided on said peripheral edges of said basic body, said flanges extending radially from said basic body;

a spring energizing said reel in a rope windup direction;

a brake piece radially and slidingly positioned on an external face of at least on of said first and second flanges of said reel, whereby said brake piece slides outward from said basic body upon application of a centrifugal force effected when a rope is wound up and whereby said brake piece slidingly contacts an inner peripheral wall of said case, said inner peripheral wall being substantially parallel to said shaft of said case; and means for holding said brake piece, said holding means positioned on the external face of the flange and comprising a projection for engagement which engages a groove for engagement provided at a substantially central position of the brake piece and slidingly holds the brake piece and ribs which are positioned on the external face of said flange on both sides of the brake piece and guides sliding movement of the brake piece.

4. The pet rope winder according to claim 3, wherein said projection for engagement comprise: a shaft section engaged in the groove for engagement; and a head section not engaged in the groove for engagement; and having a larger diameter than that of the groove for engagement; and a hole communicated to the groove for engagement and having a larger diameter than a width of said groove for engagement in which the head section of the projection for engagement is engaged as provided in the brake piece.

5. A pet rope winder comprising:

a case;

a reel rotatably accommodated in said case and supported by a shaft provided in said case, said reel comprising a basic body having peripheral edges and first and second flanges provided on said peripheral edges of said basic body, said flanges extending radially from said basic body;

a spring energizing said reel in a rope windup direction;

a brake piece radially and slidingly positioned on an external face of at least one of said first and second flanges of said reel, whereby said brake piece slides outward from said basic body upon application of a centrifugal force effected when a rope is wound up and whereby said brake piece slidingly contacts an internal peripheral wall of said case, said internal peripheral wall being substantially parallel to said shaft of said case; and means for holding said brake piece, said holding means positioned on the external face of the flange and comprising an engagement piece having an L-shaped cross section which engages the rear edge of the brake piece at a substantially intermediate position thereof and formed in a bending form in the side of the tip section of the brake piece along a length longer than a sliding range of the brake piece and ribs which are positioned on the external face of the flange on both sides of the brake piece and guide sliding movement of the brake piece.

* * * * *